(12) United States Patent
Lok et al.

(10) Patent No.: US 9,731,287 B2
(45) Date of Patent: Aug. 15, 2017

(54) METHODS AND APPARATUSES FOR REGENERATING CATALYST PARTICLES

(71) Applicant: UOP LLC, Des Plaines, IL (US)

(72) Inventors: Ka Lok, Buffalo Grove, IL (US);
Jennifer J Ozmen, Chicago, IL (US);
William Yanez, Crystal Lake, IL (US);
Mary Wier, Schaumburg, IL (US);
Richard Gaicki, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 239 days.

(21) Appl. No.: 14/470,840

(22) Filed: Aug. 27, 2014

(65) Prior Publication Data
US 2016/0059227 A1   Mar. 3, 2016

(51) Int. Cl.
| | | |
|---|---|---|
| *B01J 23/96* | (2006.01) | |
| *B01J 38/44* | (2006.01) | |
| *B01J 8/12* | (2006.01) | |
| *B01J 8/28* | (2006.01) | |

(52) U.S. Cl.
CPC .............. *B01J 38/44* (2013.01); *B01J 8/125* (2013.01); *B01J 8/28* (2013.01)

(58) Field of Classification Search
CPC ... B01J 38/44; B01J 23/96; B01J 8/125; B01J 8/28
See application file for complete search history.

(56) References Cited

U.S. PATENT DOCUMENTS

| | | |
|---|---|---|
| 3,981,824 A | 9/1976 | Greenwood et al. |
| 4,701,429 A | 10/1987 | Greenwood |
| 7,585,803 B1 * | 9/2009 | Price ................. B01J 23/96 208/140 |
| 8,778,823 B1 * | 7/2014 | Oyekan .............. B01J 38/44 502/37 |

* cited by examiner

*Primary Examiner* — Aileen B Felton

(57) ABSTRACT

Apparatuses and methods are provided for regenerating catalyst particles. In one embodiment, a method for regenerating catalyst particles includes passing the catalyst particles through a halogenation zone and a drying zone. The method feeds drying gas to the drying zone and passes a first portion of the drying gas from the drying zone to the halogenation zone. The method includes removing a second portion of the drying gas from the drying zone and injecting a halogen gas into the second portion of the drying gas. Further, the method includes delivering the halogen gas and the second portion of the drying gas to the halogenation zone. In the method, substantially all of the drying gas fed to the drying zone enters the halogenation zone.

12 Claims, 1 Drawing Sheet

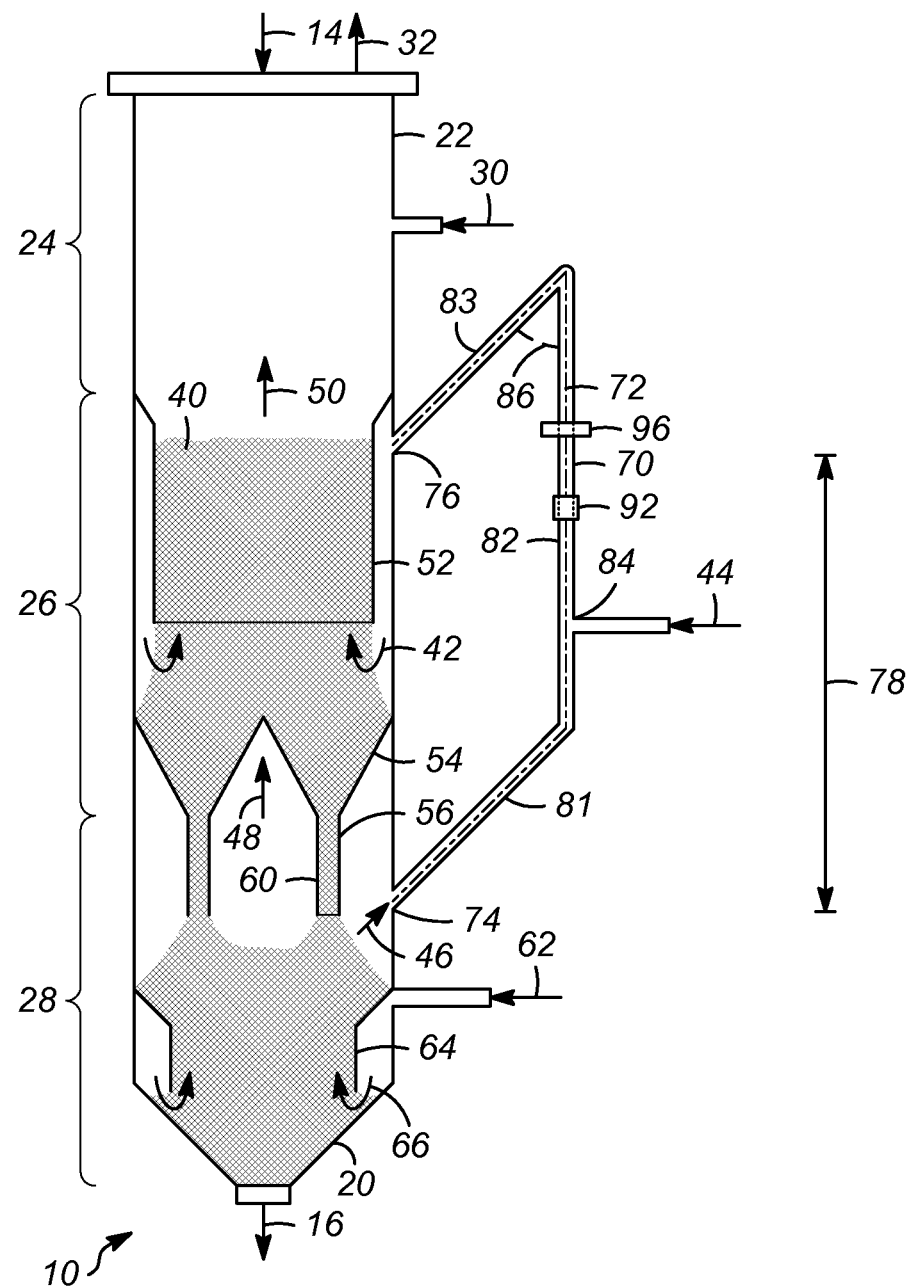

METHODS AND APPARATUSES FOR REGENERATING CATALYST PARTICLES

TECHNICAL FIELD

The present disclosure generally relates to methods and apparatuses for regenerating catalyst particles, and more particularly relates to methods and apparatuses for regenerating catalyst particles in a vessel that remove a drying gas from the vessel at a drying zone and that reintroduce the drying gas to the vessel at a halogenation zone.

BACKGROUND

Catalytic processes for the conversion of hydrocarbons are well known and extensively used. Invariably the catalyst used in these processes becomes deactivated for one or more reasons. Where the accumulation of coke deposits causes the deactivation, reconditioning of the catalyst to remove coke deposits restores the activity of the catalyst. Coke is normally removed from catalyst by a regeneration operation that contacts the coke containing catalyst at high temperature with an oxygen containing gas to combustively remove the coke. Regeneration may be carried out in-situ or the catalyst may be removed from a vessel in which the hydrocarbon conversion takes place and transported to a separate regeneration zone for coke removal. Arrangements for continuously or semi-continuously removing catalyst particles from a reaction zone for coke removal in a regeneration zone are well known.

In continuous or semi-continuous regeneration processes, catalyst particles are at least periodically added and withdrawn from a bed of catalyst in which the coke is combusted. Regions of intense burning that extend through portions of the catalyst bed develop as the coke is combusted. After this intense burning, certain catalysts require reconditioning to restore their effectiveness. For example reforming catalysts typically contain halogens, such as chloride compounds, and noble metals, usually platinum. These catalysts require reconditioning to restore the activity of the noble metal to its most highly catalytic state and to replace the halogen on the catalyst that may be lost in the reaction zone or through the combustion of coke. Reconditioning for a reforming catalyst will include contact with a halogen containing compound, to redistribute the platinum metal and replace the halogen that may be lost from the catalyst, followed by a drying step to reduce the moisture content of the catalyst. Consequently, catalyst residence time, flow rate, temperature and halogen mixing are critical variables for optimal catalyst performance.

Typically, regeneration of catalyst particles is performed in a single vessel including a coke combustion zone, a halogenation zone and a drying zone. The catalyst particles move downward under the force of gravity through the vessel while a combustion gas, halogenation gas, and drying gas move upward through selected zones. Often, the halogenation gas is added to the drying gas within an interzone tunnel in the vessel and is fed into the halogenation zone. Such an arrangement may cause reduced catalyst bed volume for catalyst particle flow and reduced catalyst resident time. Catalyst residence time in the halogenation zone is a key variable for reconditioning the catalyst to its most highly active state. Further, such an arrangement may require a larger vessel to provide a desired residence time and rate of regeneration, leading to increased expense. Also, as the external halogenation piping loop increases, heat loss increases, leading to added expense for maintaining targeted temperatures.

Accordingly, it is desirable to provide methods and apparatuses for regenerating catalyst particles in a vessel that remove a drying gas from the vessel at a drying zone and that reintroduce the drying gas to the vessel at a halogenation zone. In addition, it is desirable to develop methods and apparatuses for efficiently regenerating catalyst particles with appropriate catalyst resident times while minimizing vessel size. Furthermore, other desirable features and characteristics of the present embodiment will become apparent from the subsequent detailed description and the appended claims, taken in conjunction with the accompanying drawings and this background.

BRIEF SUMMARY

Methods and apparatuses for regenerating catalyst particles are provided. In an exemplary embodiment, a method for regenerating catalyst particles includes passing the catalyst particles through a halogenation zone and a drying zone. The method feeds drying gas to the drying zone and passes a first portion of the drying gas from the drying zone to the halogenation zone. The method includes removing a second portion of the drying gas from the drying zone and injecting a halogen gas into the second portion of the drying gas. Further, the method includes delivering the halogen gas and the second portion of the drying gas to the halogenation zone. In the method, substantially all of the drying gas fed to the drying zone enters the halogenation zone.

In another embodiment, a method for regenerating catalyst particles includes passing the catalyst particles through a halogenation zone and a drying zone in a vessel. The method passes drying gas through the drying zone at a first flow rate. The method includes removing a portion of the drying gas from the vessel and injecting a halogen gas into the portion of the drying gas. The method delivers the halogen gas and the portion of the drying gas to the halogenation zone. The method further includes passing the drying gas and halogen gas through the halogenation zone at a second flow rate. In the method, the second flow rate: first flow rate ratio is less than about 1.

Another embodiment provides an apparatus for regenerating catalyst particles. The apparatus for regenerating catalyst particles includes a vessel with a halogenation zone and a drying zone. The vessel defines a catalyst path through the halogenation zone and the drying zone. The apparatus includes a drying zone input for feeding drying gas into the drying zone. A drying zone output is located at a removal location and is provided for removing a portion of the drying gas from the drying zone. A halogenation zone input in fluid communication with the halogenation zone is provided and located at a delivery location distanced from the removal location by a first distance. The apparatus includes an external tunnel providing fluid communication from the drying zone output to the halogenation zone input. The external tunnel has a flow path length less than about 4 times the first distance.

BRIEF DESCRIPTION OF THE DRAWINGS

The present embodiment will hereinafter be described in conjunction with the following drawing FIGURE, wherein:

The FIGURE is a schematic diagram of an exemplary embodiment of a method and an apparatus for regenerating catalyst particles.

DETAILED DESCRIPTION

The following detailed description is merely exemplary in nature and is not intended to limit the application and uses of the embodiment described. Furthermore, there is no intention to be bound by any theory presented in the preceding background or the following detailed description.

The various embodiments described herein relate to methods and apparatuses for regenerating catalyst particles. As described in more detail below, exemplary embodiments pass the catalyst particles through a halogenation zone and a drying zone. In exemplary embodiments, optimal halogen mixing in the gas phase in the halogenations zone provides for proper catalyst regeneration. For a constant flow rate, flow rate velocity increases with smaller pipe sizes, improving halogen mixing. In exemplary embodiments, drying gas is fed to the drying zone. A first portion of the drying gas passes from the drying zone directly to the halogenation zone. A second portion of the drying gas, including all of the remaining drying gas, is removed from the vessel. Specifically, in the exemplary embodiments, the second portion of the drying gas flows through an external tunnel, outside of the vessel, that reconnects to the vessel at the halogenation zone. The exemplary embodiment injects the halogenation gas into the external tunnel. In exemplary embodiments, substantially all of the drying gas fed to the drying zone enters the halogenation zone, whether directly from the drying zone or through the external tunnel.

Reference is now made to an exemplary embodiment of an apparatus 10 for regenerating catalyst particles 14 to form regenerated catalyst particles 16 in the FIGURE. As shown, the apparatus 10 includes a vessel 20. An exemplary vessel 20 includes a cylindrical vessel wall 22. Within the vessel 20, processing zones are provided for sequentially treating the downwardly moving catalyst particles 14. Specifically, the vessel 20 includes a coke combustion zone 24, a halogenation zone 26, and a drying zone 28. As shown, the zones are arranged such that the catalyst particles 14 follow a flow path through the coke combustion zone 24, the halogenation zone 26, and the drying zone 28 before exiting the vessel 20 as regenerated catalyst particles 16.

As shown, an oxygen containing gas 30 is introduced to the combustion zone 24. The catalyst particles 14 are contacted with the oxygen containing gas 30 to remove coke that has accumulated on surfaces of the catalyst particles 14 during a hydrocarbon conversion reaction. Coke is comprised primarily of carbon but is also comprised of a relatively small quantity of hydrogen. The mechanism of coke removal is oxidation to carbon monoxide, carbon dioxide, and water. Coke content of spent catalyst particles 14 may be as much as about 20% of the catalyst weight, but from about 5 to about 7% is a more typical amount. Within the combustion zone 24, coke is usually oxidized at temperatures ranging from about 450° C. to about 540° C., but temperatures in localized regions may reach 590° C. or more.

An exemplary oxygen containing gas 30 contains a low concentration of oxygen usually on the order of about 0.5 to about 1.5% by volume. An exemplary form of the combustion zone 24 uses screens (not shown) to contain the coke containing catalyst particles 14 in a tapered bed configuration (not shown) while the oxygen containing gas 30 passes radially through the bed. As the coke is combusted, the small amount of hydrogen within the coke reacts with the oxygen to form water. Combustion effluent made up of carbon monoxide, carbon dioxide, water, unreacted oxygen, chlorine, hydrochloric acid, nitrous oxides, sulfur oxides and nitrogen is collected from the combustion zone 24 and withdrawn from the regeneration vessel 20 as flue gas 32. The flue gas 32 may be processed, mixed with make-up oxygen containing gas, and recycled as oxygen containing gas 30. A small amount of the flue gas 32 may be vented off from the process to allow the addition of the make-up oxygen containing gas. The make-up oxygen containing gas 30 may be air. The amount of air needed to replenish the oxygen consumed during coke combustion is relatively small, such as about 3% of the volumetric rate of the oxygen containing gas 30.

After coke on the catalyst particles 14 has been combusted, the resulting substantially carbon free catalyst particles 40 are passed to the halogenation zone 26. In an exemplary embodiment, the catalyst particles include chloride compounds and the halogenation zone 26 is a chlorination zone. The halogenation zone 26 receives an oxy-halogenation gas 42, such as one including a chloride containing compound and oxygen, that will react with hydroxyl groups on the catalyst support to provide active chloride and chlorine on the catalyst particles 40. An exemplary catalyst composition will have a chloride concentration in a range of from about 0.4 to about 1.4 wt. %, for example from about 0.8 to about 1.2 wt. %. The function of the halogenation zone 26 is to transfer chloride to the catalyst and redisperse platinum on the catalyst. Therefore, the halogenation zone 26 is maintained at conditions that will provide chlorine and chloride compounds such as hydrogen chloride. The exemplary oxy-halogenation gas 42 includes a halogen containing gas 44, such as a hydrogen chloride or other chlorine compound containing gas, and an oxygen containing gas 46. Additional oxygen containing gas 48 may flow into the halogenation zone 26 separately from the oxy-halogenation gas 42. In an exemplary embodiment, the oxygen content in the halogenation zone 26 will be from about 10 to about 21 mol. %. In an exemplary embodiment, the halogenation zone 26 will have a temperature of from about 200° C. to about 590° C., for example from about 425° C. to about 540° C. The halogen gas 44 may have a temperature of about 150° C. to about 400° C. upon introduction to the tunnel 70. After halogenating the catalyst particles 40, a halogenation effluent gas 50 moves upwardly through the vessel 20 and exits the vessel 20 separately or combined with flue gas 32, as is known in the art.

In the halogenation zone 26, an annular baffle wall 52 defines an inner flow path through a halogenation bed for the catalyst particles 40 and an outer flow path for the oxy-halogenation gas 42. Further, permeable conical baffles 54 define a bottom of the halogenation zone 26 and funnel the halogenated catalyst particles 60 to annulus 56 through which the halogenated catalyst particles 60 descend into the drying zone 28. The oxygen containing gas 48 may flow upward through the permeable conical annulus 56 and into the halogenation zone 26.

As shown, a drying gas 62 is fed through the vessel wall 22 into the drying zone 28. An exemplary drying gas 62 is air. The temperature of an exemplary drying gas 62 is from about 540° C. to about 580° C., such as about 560° C. As shown, the drying gas 62 is directed downwardly into the drying zone 28 by an annular baffle wall 64. The drying gas 66 then contacts and removes water from the halogenated catalyst particles 60. Dried regenerated catalyst particles 16 then exit the vessel 20 while the drying gas 66 moves upwardly. The drying gas 66 then passes upwardly into the halogenation zone 26 as oxygen containing gas 46 or oxygen containing gas 48 as described below.

The FIGURE further illustrates that the apparatus 10 includes an external tunnel 70. External tunnel 70 provides a flow path, indicated by line 72, outside of the vessel 20 for passing the oxygen containing gas 46 from the drying zone 28 to the halogenation zone 26. As shown, the external tunnel 70 includes a drying zone outlet from the vessel 20 at location 74 and a halogenation inlet to the vessel 20 at location 76. The drying zone outlet 74 and halogenation zone inlet 76 are separated by a distance "D" indicated by double headed arrow 78.

As shown, the exemplary external tunnel 70 is formed with a first section 81, a second section 82, and a third section 83. The first section 81 is in fluid communication with the drying zone 28 and the third section 83 is in fluid communication with the halogenation zone 26. The halogen containing gas 44 is injected to the second section 82 at injection location 84. Some mixing between the gas 44 and the gas 46 may occur at the injection location 84. The external tunnel 70 is formed with an acute angle 86 between the second section 82 and the third section 83. In an exemplary embodiment, the angle 86 is greater than about 30 degrees and less than about 60 degrees, such as about 45 degrees. In certain embodiments, passage of the gas 44 and gas 46 along the flow path 72 through the acute angle 86 provides for additional, and sufficient, mixing between the gas 44 and gas 46 without requiring additional mixing apparatuses. In other embodiments, a mixing device such as static mixer may be positioned in tunnel 70 to provide additional mixing, as described below.

Further, the external tunnel 70 is provided with limited connections to avoid pressure loss. Specifically, the drying zone outlet 74 and the halogenation zone inlet 76 are nozzles providing fluid communication between the external tunnel 70 and the environment within the vessel 20. Injection location 84 is also provided as a nozzle for injecting the gas 44 into the external tunnel 70. No other streams are added to or withdrawn from the external tunnel 70. Thus, the exemplary external tunnel 70 includes no other gas exchange locations or apparatuses that may cause a pressure loss.

The external tunnel 70 is designed with a limited linear length to further avoid pressure loss and temperature loss of the gas stream 46. Specifically, the length (L) of the flow path 72 through section 81, section 82, and section 83 is less than about four times the distance (D) 78 (L<4D). In certain embodiments, the length (L) of the flow path 72 through section 81, section 82, and section 83 is less than about three times the distance 78 (L<3D). For example, the length (L) of an exemplary flow path 72 through section 81, section 82, and section 83 is less than about two times the distance 78 (L<2D). The length and diameter of external tunnel 70 is provided such that the pressure drop of stream 46 through the external tunnel 70 is less than 95%, such as about 70% to about 95%, or even less than 70%, of the pressure drop of stream 48 from zone 28 to zone 26 through annulus 56.

In certain exemplary embodiments, the external tunnel 70 includes a mixing device 92. An exemplary mixing device 92, such as a static mixer, provides for enhanced mixing of the halogen containing gas 44 and the oxygen containing gas 46. Such mixing device 92 may be included in apparatus 10 without adhering to physical size constraints imposed by the vessel 20. Specifically, the mixing device 92 is provided outside of the vessel 20 and does not cause a reduction in vessel volume for the coke combustion zone 24, halogenation zone 26, or drying zone 28.

Further, in certain exemplary embodiments, the external tunnel includes a thermal expansion device 96. An exemplary thermal expansion device 96 is an expansion bellow. During normal regeneration conditions, the operating temperature of the vessel wall 22, temperature of stream gas 46, temperature of stream gas 62, temperature of stream gas 42, temperature of stream gas 48, temperature of moving catalyst 40, temperature of operating tunnel 70 are within about 50 to about 300° C. (about 90 to about 540° F.) of each other. During normal startup, normal shutdown and emergency shutdown conditions, these individual transient operating temperatures can differ by about 200 to about 600° C. (about 360 to about 1080° F.). Thermal expansion device 96 provides mechanical flexibility for the tunnel 70 for which the relative movement in outlet 74 and inlet 76 of the vessel 20 varies with various operation modes of the regeneration.

During a regeneration process, about 5 to about 20 wt. % of the drying gas 62 entering the drying zone 28 passes directly to the halogenation zone 26 as stream 48. Accordingly, about 80 to about 95 wt. % of the drying gas 62 entering the drying zone 28 is removed from the drying zone 28 as stream 46 through the external tunnel 70 and is delivered to the halogenation zone 26 in mixture with the gas 44. In an exemplary embodiment, stream 48 comprises about 10 wt. % of the drying gas 62 entering the drying zone 28 and stream 46 comprises about 90 wt. % of the drying gas 62 entering the drying zone 28.

By providing a flow path 72 outside of the vessel 20 for a portion of the drying gas 62 to flow from the drying zone 28 to the halogenation zone 26, use of the internal volume of the vessel 20 for catalyst regeneration can be increased. Specifically, the halogenation zone bed bounded by the annular baffle 52 can be enlarged as compared to conventional apparatuses in which an internal flow path is formed between the halogenation zone bed and the vessel wall 22. As a result, the halogenation bed resident time can be increased while maintaining the same vessel diameter and bed length. An increase in halogenation bed resident time improves catalyst metal dispersion and metal function in catalyst regeneration. For example, revamping an existing vessel to replace an internal tunnel with an external tunnel without change to the vessel diameter or bed length can increase halogenation bed resident time by about 19%.

Also, the flow path 72 through the external tunnel 70 provides for an improved flow rate of gas through the drying zone 28 and the halogenation zone 26. For example, a flow rate of drying gas 62 through the drying zone 28 may be about 820 kg/hr to about 1360 kg/hr (about 30 lb/hr to about 50 lb/hr). A slower flow rate may lead to insufficient drying of the catalyst particles. In the exemplary apparatus 10, the flow rate of the gases 44, 46 and 48 through the halogenation zone 26 is less than the flow rate of drying gas 62 through the drying zone 28. As a result, the ratio of the flow rate of gas through the halogenation zone to the flow rate of gas through the drying zone is less than about 1. In an exemplary embodiment, the ratio of the flow rate of gas through the halogenation zone to the flow rate of gas through the drying zone is less than about 0.9, such as less than about 0.75, for example less than about 0.5.

As described herein, methods and apparatuses for regenerating catalyst particles have been provided. Exemplary embodiments remove a portion of a drying gas from a drying zone in a regeneration vessel and direct the portion through an external tunnel outside of the regeneration vessel before reintroducing the portion to a halogenation zone in the regeneration vessel. A halogen containing gas is mixed with the portion in the external tunnel. The remaining drying gas passes directly from the drying zone to the halogenation zone. The structure of the external tunnel provides for limited pressure loss. Exemplary method and apparatuses provide for improved catalytic regeneration processing through improved resident bed time and gas flow rates.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. A method for regenerating catalyst particles, the method comprising the steps of:
    passing the catalyst particles through a halogenation zone and a drying zone, the halogenation zone and the drying zone being located in a vessel;
    feeding drying gas to the drying zone;
    passing a first portion of the drying gas from the drying zone to the halogenation zone;
    removing a second portion of the drying gas from the drying zone;
    passing the second portion of the drying gas through an external tunnel, outside of the vessel, and reconnecting to the vessel at the halogenation zone;
    injecting a halogen gas into the external tunnel into the second portion of the drying gas; and
    delivering the halogen gas and the second portion of the drying gas from the external tunnel to the halogenation zone, wherein substantially all of the drying gas fed to the drying zone enters the halogenation zone.

2. The method of claim 1, wherein removing the second portion of the drying gas from the drying zone comprises removing the second portion of the drying gas from the vessel.

3. The method of claim 2 wherein delivering the halogen gas and the second portion of the drying gas to the halogenation zone comprises delivering the halogen gas and the second portion of the drying gas to the vessel.

4. The method of claim 1 wherein the external tunnel is formed with an elbow forming an acute angle, and wherein passing the second portion of the drying gas through the external tunnel comprises mixing the second portion of the drying gas and the halogen gas by passing the second portion of the drying gas and the halogen gas through the elbow.

5. The method of claim 1 wherein the external tunnel is formed with an elbow forming an angle of less than about 60 degrees, and wherein passing the second portion of the drying gas through the external tunnel comprises mixing the second portion of the drying gas and the halogen gas by passing the second portion of the drying gas and the halogen gas through the elbow.

6. The method of claim 3 wherein:
    removing the second portion of the drying gas comprises removing the second portion of the drying gas from the vessel at a removal location;
    delivering the halogen gas and the second portion of the drying gas comprises delivering the halogen gas and the second portion of the drying gas to the vessel at a delivery location distanced from the removal location by a first distance (D), and
    the method comprises passing the second portion of the drying gas through an external tunnel from the removal location to the delivery location, wherein the external tunnel has a flow path length (L) less than about 2 times the first distance (L<2D).

7. The method of claim 3 wherein:
    removing the second portion of the drying gas comprises removing the second portion of the drying gas from the vessel at a removal location;
    delivering the halogen gas and the second portion of the drying gas comprises delivering the halogen gas and the second portion of the drying gas to the vessel at a delivery location distanced from the removal location by a first distance (D), and
    the method comprises passing the second portion of the drying gas through an external tunnel from the removal location to the delivery location, wherein the external tunnel has a flow path length (L) less than about 4 times the first distance (L<4D).

8. The method of claim 1 wherein:
    passing the first portion of the drying gas from the drying zone to the halogenation zone comprises passing about 5 to about 20 wt. % of the drying gas from the drying zone to the halogenation zone; and
    removing the second portion of the drying gas from the drying zone comprises removing about 80 to about 95 wt. % of the drying gas from the drying zone.

9. The method of claim 1 wherein:
    passing the first portion of the drying gas from the drying zone to the halogenation zone comprises passing about 10 wt. % of the drying gas from the drying zone to the halogenation zone; and
    removing the second portion of the drying gas from the drying zone comprises removing about 90 wt. % of the drying gas from the drying zone.

10. The method of claim 1 further comprising:
    passing the drying gas through the drying zone at a first flow rate; and
    passing the drying gas and halogen gas through the halogenation zone at a second flow rate, wherein the second flow rate: first flow rate ratio is less than about 1.

11. The method of claim 1 wherein injecting the halogen gas into the second portion of the drying gas comprises injecting organic chloride into the second portion of the drying gas.

12. The method of claim 1 wherein injecting the halogen gas into the second portion of the drying gas comprises injecting organic chloride at a temperature of about 150° C. to about 400° C. into the second portion of the drying gas.

* * * * *